(12) United States Patent
Suciu et al.

(10) Patent No.: US 8,292,570 B2
(45) Date of Patent: Oct. 23, 2012

(54) LOW PRESSURE TURBINE WITH COUNTER-ROTATING DRIVES FOR SINGLE SPOOL

(75) Inventors: Gabriel L. Suciu, Glastonbury, CT (US); Om P. Sharma, South Windsor, CT (US); Lawrence E. Portlock, Bethany, CT (US); Brian D. Merry, Andover, CT (US); Shankar S. Magge, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1586 days.

(21) Appl. No.: 12/019,919

(22) Filed: Jan. 25, 2008

(65) Prior Publication Data
US 2009/0191045 A1   Jul. 30, 2009

(51) Int. Cl.
*F01D 1/24* (2006.01)
(52) U.S. Cl. ............................. 415/68; 415/69
(58) Field of Classification Search .............. 415/68, 415/65, 66, 67, 69; 60/226.1
See application file for complete search history.

(56) References Cited

U.S. PATENT DOCUMENTS

| | | | |
|---|---|---|---|
| 2,472,878 A * | 6/1949 | Baumann | 415/69 |
| 4,817,382 A * | 4/1989 | Rudolph et al. | 60/268 |
| 5,010,729 A * | 4/1991 | Adamson et al. | 60/226.1 |
| 5,226,350 A | 7/1993 | Cycon | |
| 5,281,099 A | 1/1994 | Hunter | |
| 5,307,622 A | 5/1994 | Ciokajlo | |
| 5,351,913 A | 10/1994 | Cycon | |
| 5,364,230 A | 11/1994 | Krauss | |
| 6,619,030 B1 | 9/2003 | Seda | |
| 6,684,626 B1 | 2/2004 | Orlando | |
| 6,711,887 B2 | 3/2004 | Orlando | |
| 6,732,502 B2 | 5/2004 | Seda | |
| 6,739,120 B2 | 5/2004 | Moniz | |
| 6,763,652 B2 | 7/2004 | Baughman | |
| 6,763,653 B2 | 7/2004 | Orlando | |
| 6,763,654 B2 | 7/2004 | Orlando | |
| 7,186,073 B2 | 3/2007 | Orlando | |

* cited by examiner

*Primary Examiner* — Dwayne J White
(74) *Attorney, Agent, or Firm* — Carlson, Gaskey & Olds, PC

(57) ABSTRACT

A low pressure turbine for a gas turbine engine includes inner and outer counter-rotating rotor sets, with both said rotor sets driving a common shaft.

7 Claims, 2 Drawing Sheets

LOW PRESSURE TURBINE WITH COUNTER-ROTATING DRIVES FOR SINGLE SPOOL

BACKGROUND OF THE INVENTION

This application relates to a low pressure turbine for a gas turbine engine in which there are inner and outer counter-rotating blade sets, and wherein the two blade sets drive a common shaft to drive a fan.

Gas turbine engines are known and typically include a fan delivering air to compressor sections. The air is compressed and delivered into a combustor section where it is mixed with fuel and combusted. Products of this combustion pass downstream over turbine stages. Typically, there is a high pressure turbine over which the products of combustion expand to drive a shaft. The high pressure turbine typically drives a high pressure compressor in the compressor section. Downstream of the high pressure turbine is a low pressure turbine. The low pressure turbine has lower pressure products of combustion expand over its blades, to drive a low pressure compressor and a fan. Typically, the low pressure turbine may drive the fan at an undesirably high rate of speed. Thus, various steps are taken to lower the speed of the fan as driven by the low pressure turbine.

One common step is to include additional stages in the low pressure turbine. This is undesirable as it adds to the weight and complexity of the gas turbine engine.

It is also known to provide gearing between the shaft that is driven by the low pressure turbine and the fan to reduce the rate of speed of the fan.

It is also known to provide counter-rotating inner and outer rotor sets in the low pressure turbine. In this manner, the number of turbine stages is effectively increased by replacing the prior art static vanes with the rotating outer rotor stage. Typically, this has been utilized to drive components in the gas turbine engine through two separate shafts.

SUMMARY OF THE INVENTION

In a disclosed embodiment of this invention, a low pressure turbine is provided with inner and outer counter-rotating blade sets. The outer blade set drives a common shaft with the inner blade set. The common shaft in turn drives the fan.

These and other features of the present invention can be best understood from the following specification and drawings, the following of which is a brief description.

DETAILED DESCRIPTION OF THE PREFERRED EMBODIMENT

Figure 1:
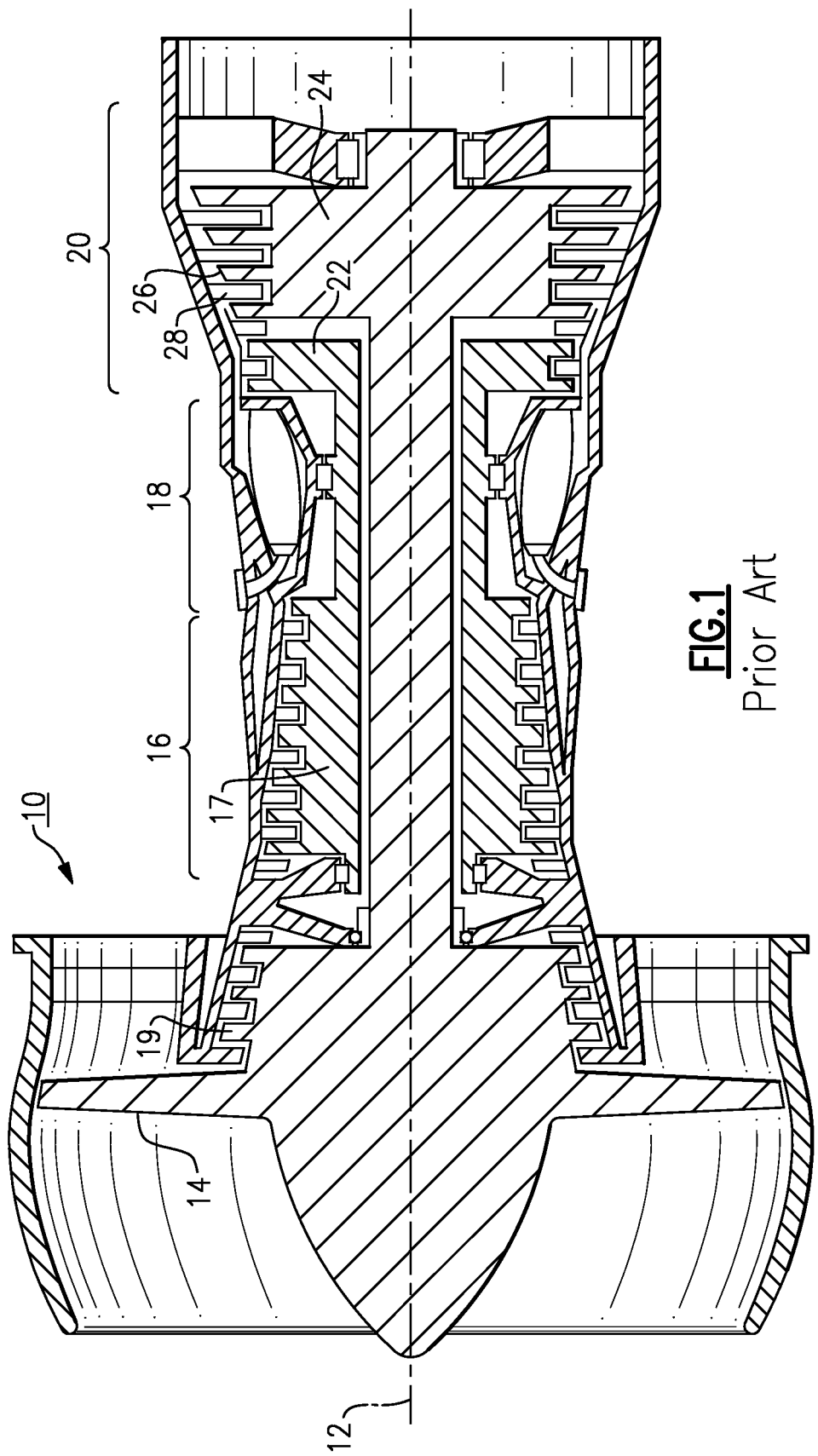
FIG. 1 schematically shows a known gas turbine engine.

A gas turbine engine 10, such as a turbofan gas turbine engine, circumferentially disposed about an engine centerline, or axial centerline axis 12 is shown in FIG. 1. The engine 10 includes a fan 14, a compressor 16, a combustion section 18 and a turbine 20. As is well known in the art, air compressed in the compressor 16 is mixed with fuel and burned in the combustion section 18 and expanded in turbine 20. The turbine 20 includes rotors 22 and 24 which rotate in response to the expansion, driving the compressor 16 and fan 14. The turbine 20 comprises alternating rows of rotary airfoils or blades 26 and static airfoils or vanes 28. In fact, this view is quite schematic, and blades 26 and vanes 28 are actually removable.

The rotor 22 is a high pressure turbine, and drives a high pressure compressor section 17. The turbine rotor 24 is the low pressure turbine, and it drives the fan 14, and a low pressure compressor 19.

It should be understood that this view is included simply to provide a basic understanding of the sections in a gas turbine engine, and not to limit the invention. This invention extends to all types of turbine engines for all types of applications.

Figure 2:
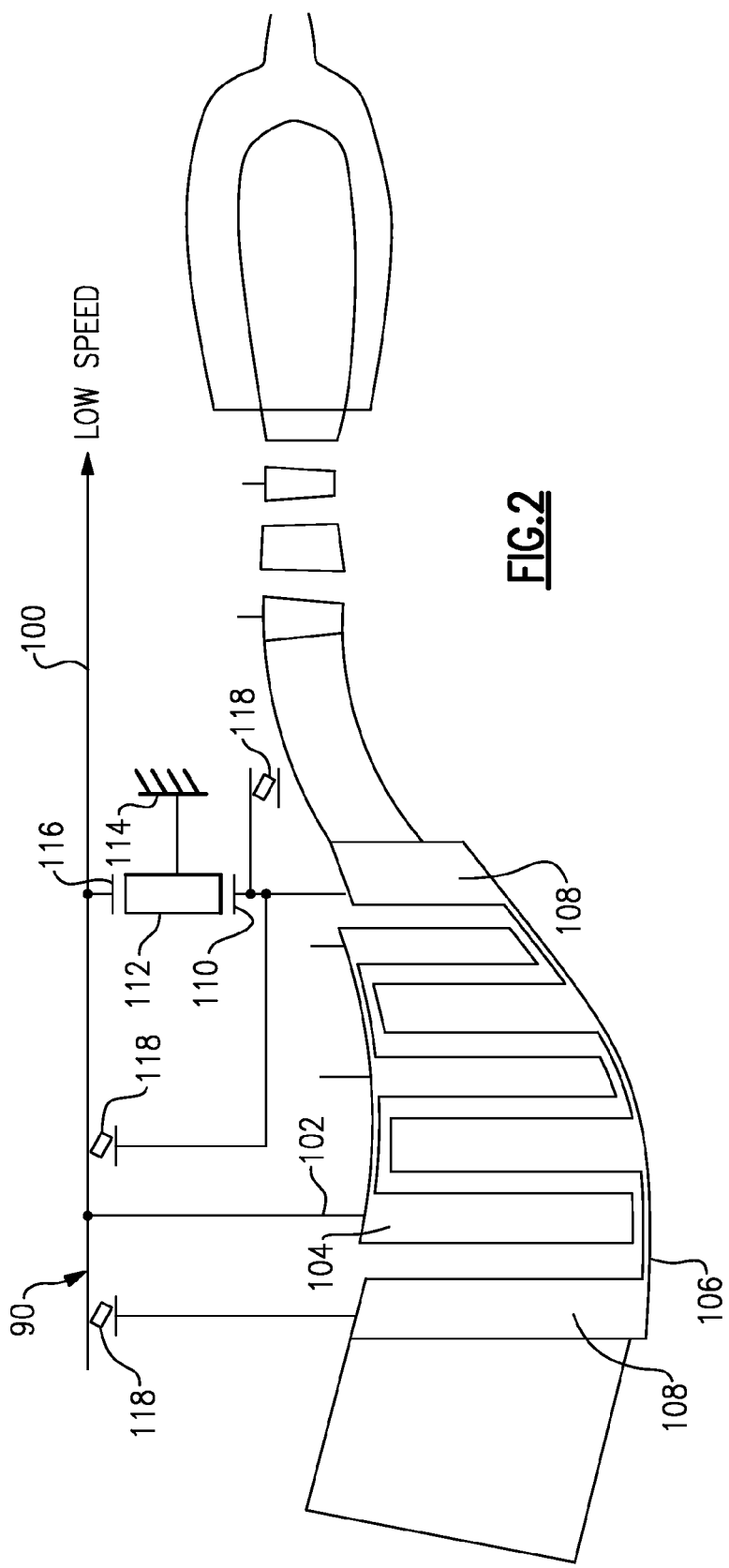
FIG. 2 is a cross-sectional view through the low pressure turbine in a gas turbine engine.

FIG. 2 schematically shows a low pressure turbine 90 as may be included in the FIG. 1 engine. As shown, a low speed or low spool shaft 100 is driven by a turbine blade set 102, having blades 104. These blades rotate, as known, to cause the shaft 100 to rotate. The prior art of FIG. 1 included static vanes between rotor stages. The low pressure turbine 90 shown in FIG. 2, includes an outer rotor set 106 including outer rotor blades 108 interspersed between the inner rotor blades 104. The outer rotor blades 108 include structures that rotate about bearings 118. Further, a ring gear 110 drives a plurality of planet or star gears 112 to in turn drive a sun gear 116 on the shaft 100. As shown, the star gears 112 rotate on fixed pinions that are fixed at 114 to an engine frame. As is clear, the planetary gear set 110, 112, 116 is at an axial location within the low pressure turbine 90.

The use of the two sets of counter-rotating blades results in reducing the axial length (and rotor count) of the conventional engine described in FIG. 1. Further, the torque delivered from the shaft 100 to the fan is increased. The present invention requires a much smaller gear set for the gears 110, 112, and 116 than would be the case if the gear reduction between the shaft 100 and the fan were achieved entirely with gearing, in that the gears 110, 112, and 116 only need to transmit half of the torque delivered to the shaft 100.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A low pressure turbine for a gas turbine engine comprising:
   an inner rotor including blades, said inner rotor being connected to drive a shaft;
   an outer rotor including blades, said outer rotor blades being interspaced between said inner rotor blades, and said outer rotor also being connected to drive said shaft;
   said outer rotor drives said shaft through at least one gear; and
   said at least one gear is at an axial location within the low pressure turbine.

2. The low pressure turbine as set forth in claim 1, wherein said at least one gear includes a plurality of star gears connecting a ring gear on said outer rotor to a sun gear on said shaft.

3. The low pressure turbine as set forth in claim 1, wherein at least one bearing supporting said outer rotor for rotation about said shaft.

4. The low pressure turbine as set forth in claim 1, wherein said shaft rotating directly with said inner rotor, and driven through said gear by said outer rotor.

5. A gas turbine engine comprising:
   a fan;
   a compressor section downstream of said fan;

a combustor section downstream of said compressor section;

a turbine section including a high pressure turbine section for driving a high speed shaft, and a low pressure turbine section for driving a low speed shaft;

said low pressure turbine section including an inner rotor including blades, said inner rotor being connected to drive said low speed shaft, and an outer rotor including blades, said outer rotor blades being interspaced between said inner rotor blades, and said outer rotor also being connected to drive said low speed shaft;

said outer rotor driving said low speed shaft through a ring gear;

a plurality of star gears connecting the ring gear on said outer rotor to a sun gear on said low speed shaft;

said low speed shaft driving said fan; and said ring gear, said star gears and said sun gear all being located within said low pressure turbine section.

6. The gas turbine engine as set forth in claim 5, wherein at least one bearing supporting said outer rotor for rotation about said shaft.

7. A low pressure turbine for a gas turbine engine comprising:

a ring gear, star gears, and sun gear are at an axial location within the low pressure turbine;

an inner rotor including blades, said inner rotor being connected to drive a shaft;

an outer rotor including blades, said outer rotor blades being interspaced between said inner rotor blades, and said outer rotor also being connected to drive said shaft;

said outer rotor drives said shaft through at least one gear; and said at least one gear includes a plurality of star gears connecting a ring gear on said outer rotor to a sun gear on said shaft.

* * * * *